(No Model.) 2 Sheets—Sheet 2.

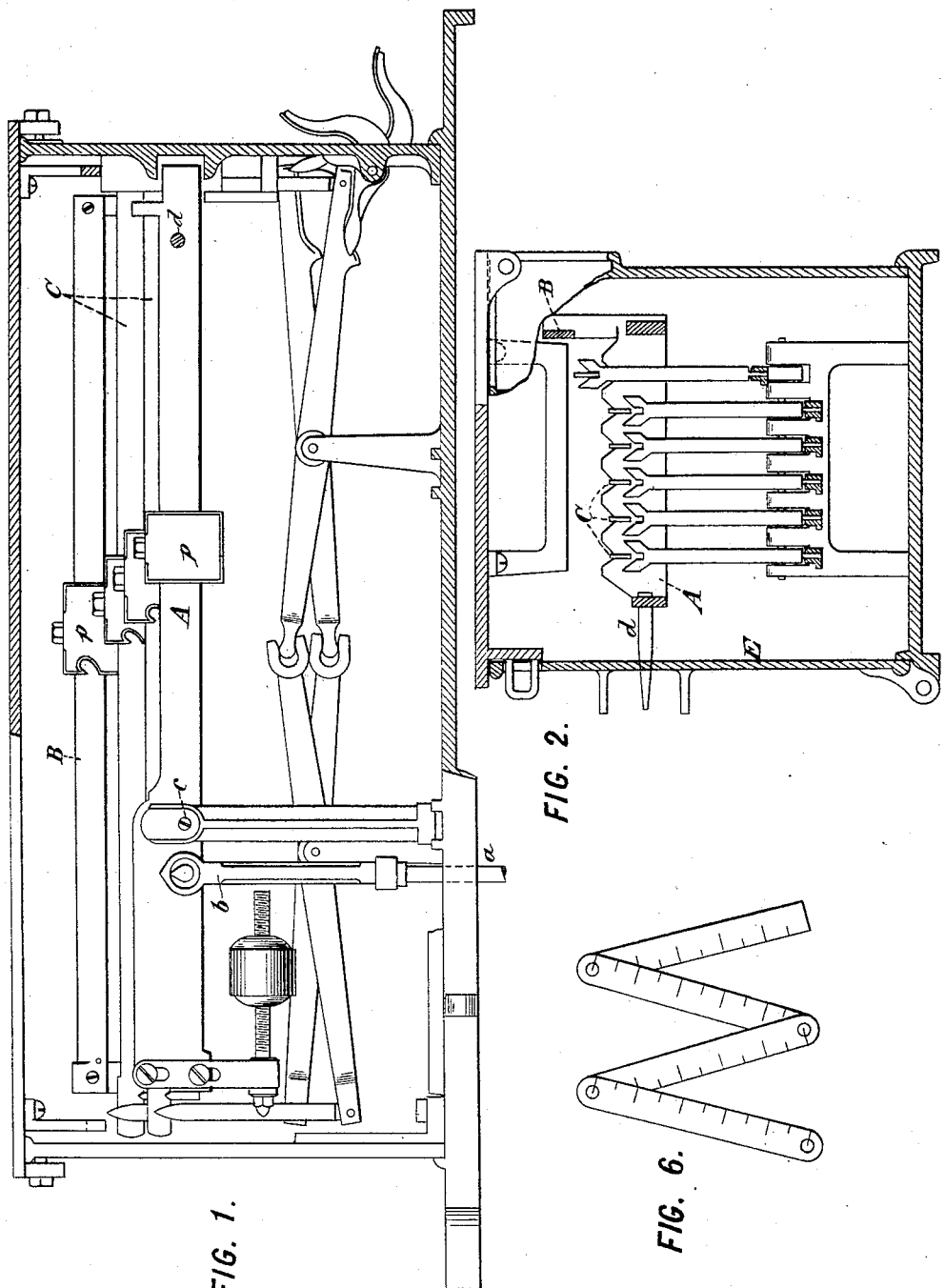

L. G. SPENCER.
WEIGHING SCALES.

No. 415,824. Patented Nov. 26, 1889.

WITNESSES:
John Becker
C. K. Fraser.

INVENTOR:
Luke G. Spencer.
By his Attorneys,
Arthur C. Fraser & Co.

UNITED STATES PATENT OFFICE.

LUKE G. SPENCER, OF ST. JOHNSBURY, VERMONT, ASSIGNOR TO THE E. & T. FAIRBANKS & COMPANY, OF SAME PLACE.

WEIGHING-SCALES.

SPECIFICATION forming part of Letters Patent No. 415,824, dated November 26, 1889.

Application filed August 6, 1889. Serial No. 319,865. (No model.)

*To all whom it may concern:*

Be it known that I, LUKE G. SPENCER, a citizen of the United States, residing in St. Johnsbury, in the county of Caledonia and State of Vermont, have invented certain new and useful Improvements in Weighing-Scales, of which the following is a specification.

This invention relates to weighing-scales, and especially to what are known as "ingredient-scales" or "charging-scales," employed to weigh out the proportions of different ingredients used for charging furnaces or for compounding ingredients according to fixed proportions.

The object of the invention is to guard more effectually than heretofore the secrecy of the formulas for which the scale is used, in order that unauthorized persons shall not be able to ascertain the weights of the different ingredients entering into a composition or the weights of the charges, such as of ore, flux, and fuel fed to blast-furnaces, &c.

The invention is applicable to any scale which is set to weigh fixed charges and the weight of which it is desired to keep secret or to conceal from inspection.

Heretofore all such scales have had their beams marked or graduated in such manner that any person who could get access to the beam could readily ascertain the weight at which the scale was set. According to my invention I make the scale-beams entirely blank or devoid of graduations, so that the position of the poise on the beam affords no indication of the weight which it will counterbalance. The graduations for the beam, which are essential to enable the parts to be set to any determined weight, are marked, according to my invention, upon a separate bar, which is applied to the beam whenever it is desired to readjust the poise, and which is removable therefrom, and may be carried away and locked up or kept in charge of the foreman. The scale-beam and bar are marked or constructed with reciprocal index points or shoulders or other means by which the correct and accurate placing of the bar relatively to the scale-beam is facilitated or insured.

In the accompanying drawings I have illustrated my invention as applied to what is known as an "ingredient-scale," or one in which several different scale-beams are employed to be used separately or successively for weighing the different ingredients or charges that are required to be used according to any such formula.

Figure 3:
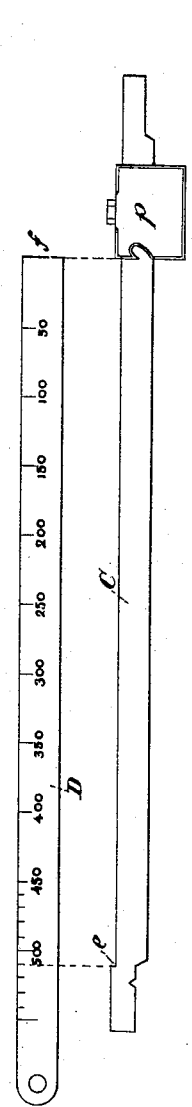
Figure 4:
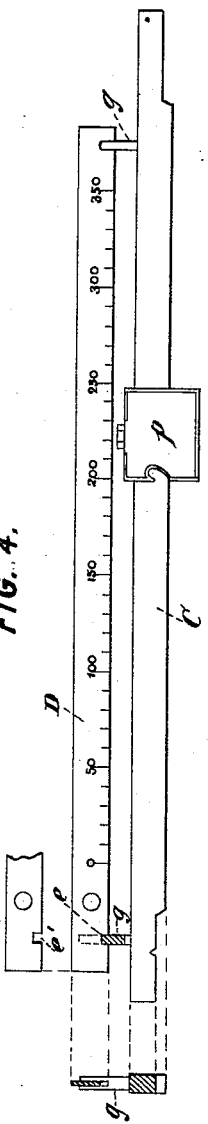
Figure 5:
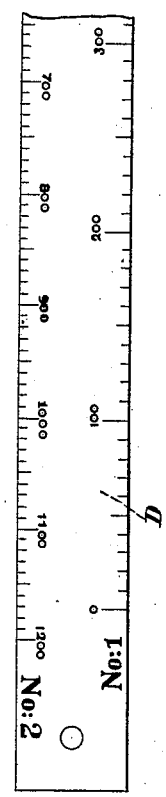

Figure 1 is a front elevation of the ingredient-scale, the front door being removed or turned open and the case partly in section. Fig. 2 is an end elevation, the case being partly in section. Fig. 3 is a front elevation of one of the scale-beams removed with the graduated bar applied to it. Fig. 4 is a similar view showing a modified means of applying the bar. Fig. 5 is a fragmentary view of one construction of bar on a larger scale. Fig. 6 shows a folding graduated bar.

The construction of ingredient-scale shown in Figs. 1 and 2 is one that is well known in the art as the "Fairbanks Charging-Scale." It is fully illustrated and described in the patent of William J. Miller, No. 245,853, dated August 16, 1881, to which reference may be made for a complete understanding of it. I will therefore not describe this scale further than to state that the platform is connected through the usual compound levers and the steelyard-rod $a$ and link $b$, Fig. 1, with the main scale-beam A, consisting of a rectangular frame fulcrumed at $c$ on opposite sides, carrying a tare-beam B, rigidly secured above it, and being constructed to form a seat for one, two, or more supplementary and removable ingredient or charge beams C C. Means are provided for lifting these beams C C entirely off the beam A, and for dropping any one or more of them at will upon the main beam, whereby any one or more of them may be used at any time for weighing the ingredients to which they correspond.

In Fig. 2 six ingredient-beams C C are shown, five of them being dropped upon the main beam A, and the sixth (shown at the right) being lifted off from it. The main beam A carries a pin $d$, which projects through a slot in the front door E, and the movement of which, with reference to an indicating-point, (not shown,) indicates when the beam has been brought to equipoise.

The tare-beam B, although it may be employed for any usual weighing purpose, is used generally for counterpoising the tare or weight of the wheelbarrow or other receptacle used for transporting the material being weighed. The ingredient-beams C C are used each for weighing a separate charge or ingredient, to the weight of which each is separately set. Each of the beams is provided with one or more poises $p$ $p$, as usual, these being preferably provided with set screws or nuts to bind them in place after adjustment.

Referring now to Fig. 3, C designates one of the ingredient-beams removed from the scale, (or it may designate the tare-beam B or any other scale-beam.) It is to be observed that this beam is entirely devoid of graduations, being what I call a "blank scale-beam." The poise $p$ consequently, when adjusted to any position, affords no indication to an observer of the beam of the weight at which it is set. The graduations which heretofore have been applied to the beam are applied to a separate bar D, which is shown in Fig. 3 as being arranged parallel with the beam and lifted slightly above it. The beam C is provided with an index point or mark $e$, which in this instance is a shoulder formed near one end, and which may or may not correspond to the zero-point on the beam. It is by means of this index-point $e$ that the bar D is made applicable for admitting of the adjustment of the poise $p$ on the scale-beam.

In Fig. 3 the poise $p$ is shown set at five hundred and ten pounds, as shown by the dotted lines. To set the poise to this or any other denomination, the desired graduation on the bar D is brought to coincidence with the shoulder $e$ on the beam C, and the poise $p$ is moved against the opposite end $f$ of the bar D, which thus corresponds to zero; or the bar D might be turned the other side up, bringing its zero-point $f$ into coincidence with the index-point $e$ on the beam C, and the poise then slid along until it registers with the desired graduation on the bar. When the correct adjustment has been made, the poise is locked in position on the beam C by its set-screw and the bar D is removed to the factory-office, or it is locked up where it is inaccessible to meddlers.

Fig. 4 shows a modified arrangement, wherein the beam C is provided with two pins $g$ $g$ near its opposite ends, these pins being slotted downwardly for a short distance from the top in order to admit of the bar D being dropped into the slots, so that the pins thus form upright forks to hold the bar in position above the beam. The correct position for the bar is determined by a notch $e'$ at one or at each end, which engages the pin $g$, one side or face of which (lettered $e$) constitutes the index-point before referred to.

In the case of an ingredient-scale it is preferable to use the same bar D for all the scale-beams. Usually the several ingredient-beams C C and the tare-beam B have (as heretofore used) been graduated alike; but if such beams are used, which, if graduated, would be provided with differing graduations, these different graduations may all be indicated on the same bar D. Thus in Fig. 5 the bar is shown as consisting of a steel plate, the opposite edges of which on one face are provided with graduations which are applicable to scale-beams Nos. 1 and 2, respectively, while on the opposite faces it may be provided with graduations which are applicable to two other scale-beams.

These four different graduations will usually suffice for ordinary ingredient-scales; but if a greater number is desired two or more bars may be used, or the bar may be made in the form of a cylinder or a triangular rule, or in any convenient shape. When it is made of a flat plate, it may be conveniently constructed in sections hinged or folding together, so as to be carried in the pocket, as shown in Fig. 6.

The particular means by which the bar is made to register correctly with the scale-beam, in order that the poise may be accurately adjusted, is not material to my invention, many different expedients, on the principle of abutting shoulders or coinciding index-points, &c., being applicable.

It will be understood that my invention is applicable to any ordinary scale, whether its beam be inclosed in a locked case or not, and whether it be constructed with one or more beams.

I claim as my invention the following defined novel features and combinations, substantially as hereinbefore specified, namely:

1. The combination, with a blank scale-beam, of a removable bar corresponding thereto and marked with the graduations thereof, whereby by the use of such graduated bar the poise may be adjusted and by removing the bar all indication of the weight to which the poise is set is removed.

2. The combination, with a blank scale-beam marked with an index-point, of a removable bar marked with the graduations of said beam and applicable thereto with relation to said index-point for indicating the weight to which the poise is set.

3. The combination, with an ingredient-scale, of the ingredient-beams thereof made blank or without graduation and a removable bar corresponding to said beams and marked with the graduations thereof, whereby by the use of such graduated bar the poises of the ingredient-beams may be adjusted, and by its removal all indication of the weights to which said poises are set is removed and the discovery of the composition of any product for which the scale is being used is protected against.

In witness whereof I have hereunto signed my name in the presence of two subscribing witnesses.

LUKE G. SPENCER.

Witnesses:
G. W. BANGS,
W. L. KINNEY.